United States Patent [19]
Stemmler et al.

[11] Patent Number: 5,235,503
[45] Date of Patent: Aug. 10, 1993

[54] PROCESS AND DEVICE FOR ELIMINATING OR REDUCING HARMONICS AND/OR RESONANCE OSCILLATIONS

[75] Inventors: Herbert Stemmler, Kirchdorf; Peter Steimer, Schleinikon; Björn Odegard, Turgi, all of Switzerland

[73] Assignee: Asea Brown Boveri Ltd., Baden, Switzerland

[21] Appl. No.: 804,598

[22] Filed: Dec. 10, 1991

[30] Foreign Application Priority Data

Dec. 10, 1990 [EP] European Pat. Off. ........ 90123736.2

[51] Int. Cl.⁵ .................. H02M 1/12; H02M 5/45
[52] U.S. Cl. ......................... 363/37; 363/39; 318/811; 307/102; 307/105
[58] Field of Search ............. 363/35, 37, 39, 41, 363/98; 318/810, 811, 812; 307/102, 105

[56] References Cited

U.S. PATENT DOCUMENTS

| | | | |
|---|---|---|---|
| 4,358,811 | 11/1982 | Arremann | 363/138 X |
| 4,639,846 | 1/1987 | Dähler et al. | 363/39 |
| 4,763,059 | 8/1988 | Espelage et al. | 363/39 X |

FOREIGN PATENT DOCUMENTS 0161738 10/1988 European Pat. Off. .
0296840 12/1988 European Pat. Off. .

Primary Examiner—Emanuel T. Voeltz
Attorney, Agent, or Firm—Burns, Doane, Swecker & Mathis

[57] ABSTRACT

An a.c. machine (7) with, connected in parallel thereto, a capacitor bank (CR, CS, CT), which are fed by a converter (1-4) with a d.c. intermediate circuit, form a resonant system which is excited by the rectangular current of an inverter (4) of the converter. In this case, there is superimposition of the fundamentals and the normal harmonics in the machine voltage and in the machine current of an additional harmonic with the frequency of the resonance point. In the lower speed range of the a.c. machine (7), this excitation is eliminated by an optimum operating sequence of current gaps, which are generated inside a current block by means of a quenching circuit (3). Current gaps are generated at the start and end of each current block for the purpose of damping the 11th and 13th harmonic, and in the middle of the current block for the purpose of damping the 7th harmonic. A turn-on angle basic value signal ($\alpha_M$) is modified by a turn-on angle differential signal ($\Delta\alpha_M$) for the purpose of damping the 5th harmonic, in particular an exciting or available harmonic being controlled to 0 or in the vicinity of 0.

8 Claims, 5 Drawing Sheets

PROCESS AND DEVICE FOR ELIMINATING OR REDUCING HARMONICS AND/OR RESONANCE OSCILLATIONS

BACKGROUND OF THE INVENTION

1. Field of the Invention

The invention proceeds from a process for eliminating or reducing at least one harmonic of a static converter and/or resonance oscillations according to the preamble of patent claim 1, as well as from a device for carrying out the process according to the preamble of patent claims 8 and 9.

2. Discussion of Background

In the respective preamble, the invention relates to a prior art disclosed in EP-A2-0,296,840. For the drive of an induction motor, that document specifies a process and a device in which undesired harmonics of a resonant circuit consisting of the induction motor and a capacitor bank connected in parallel thereto are damped. When the motor is being run up, it is particularly the 5th, 7th, 11th and 13th harmonic which cause interference. The motor is fed from the inverter of a converter with a d.c. intermediate circuit. Damping of the harmonics is performed by additional timing signals at prescribable angular distances with respect to the elementary timing signal of the thyristors of the inverter.

A disadvantage of this arrangement is that the thyristors have to be operated with an increased elementary frequency.

SUMMARY OF THE INVENTION

Accordingly, the invention as defined in patent claims 1, 8 and 9 achieves the object of further developing a process and a device of the type mentioned at the beginning in such a way that the controllable valves can be operated with a comparatively low elementary frequency in the case of damping harmonics.

An advantage of the invention consists in that slow, high-blocking capability thyristors can be used as valves. The latter withstand a blocking voltage of approximately 6.5 kV, and require a circuit commutated turn-off time of approximately 400 µs-500 µs. High-speed thyristors require a circuit commutated turn-off time of approximately 100 µs, but withstand only a blocking voltage of approximately 3 kV. An approximately 1% better efficiency of the static converter can be achieved by comparison with fitting the inverter with GTO thyristors. This is of substantial economic importance, in particular, for feeding machines with a power of $\geq 1$ MW.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings

DESCRIPTION OF THE PREFERRED EMBODIMENTS

Figure 1:
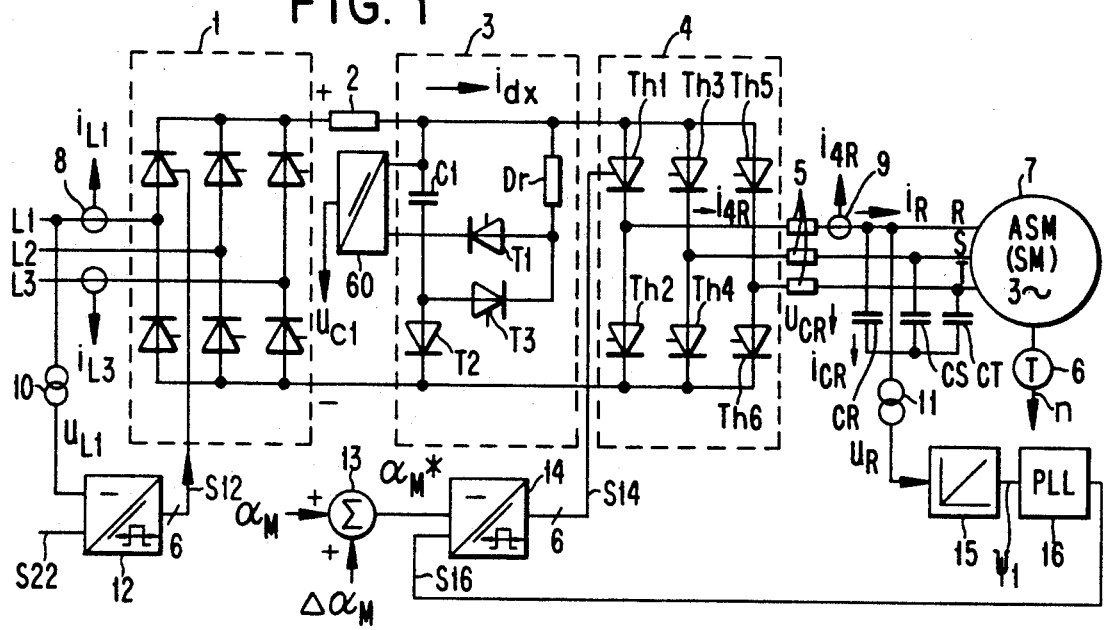
FIG. 1 shows a block diagram of a converter with a d.c. intermediate circuit and a quenching circuit for an inverter of the converter for feeding a 3-phase machine.

For the sake of simplicity, physical variables and signals proportional thereto have the same designations below. Referring now to the drawings, wherein like reference numerals designate identical or corresponding parts throughout the several views, in FIG. 1 (1) designates a 3-phase bridge-connected rectifier, which is connected on the a.c. side to phase conductors (L1-L3) and is connected on the d.c. side (+, −) via an intermediate circuit inductor (2) to an inverter (4) in a 3-phase bridge circuit. Together, the rectifier (1), intermediate circuit inductor (2), quenching circuit (3) and inverter (4) form a converter with a d.c. intermediate circuit which, for the purpose of compensating harmonics, is connected at its alternating-current output via three load or commutating inductors (5) and three load capacitors (CR, CS, CT) in a star connection or else delta connection (not represented) to a motor or an a.c. machine or a 3-phase asynchronous machine or synchronous machine (7).

Current transformers (8) in the current path of the phase conductors (L1) and (L3) serve to detect the rectifier currents ($i_{L1}$) and ($i_{L3}$), from which conclusions are drawn on the magnitude of a intermediate circuit current ($i_{dx}$). The link current ($i_{dx}$) could also be detected using a more complicated d.c. detector. A voltage transformer (10) serves to detect an input alternating voltage ($U_{L1}$) at the phase conductor (L1). The alternating voltages of the two other phase conductors (L2) and (L3) are detected in the same way (not represented). The voltage converter (10) is connected on the output side to a rectifier turn-on pulse transformer (12)

which on the output side delivers six turn-on pulses (S12) to the thyristors of the rectifier (1). The rectifier (1) can also be of 12-pulse design.

The quenching circuit (3), which is connected in parallel on the d.c. side to the inverter (4), has a first series circuit of a quenching circuit capacitor (C1) and a thyristor (T2), which is connected on the cathode side to the negative supply terminal (−). Provided in a parallel circuit to the quenching circuit capacitor (C1) is a series circuit of an inductive reactance or a ring-around inductor (Dr) and a controllable electrical valve or thyristor (T1), which is connected on the cathode side to the anode of the thyristor (T2). A thyristor (T3) is connected in reverse-parallel with the thyristor (T1). A diode (not represented) can be provided instead of the thyristor (T2), especially in the case of a low intermediate-circuit voltage. (60) designates a d.c. detector which detects at the quenching-circuit capacitor (C1) a direct voltage ($U_{C1}$) which is fed to a control device (not represented) for controlling the quenching circuit (3).

The present converter is designed, for example, for an intermediate-circuit voltage of 2.4 kV and an intermediate-circuit current ($i_{dx}$) of 840 A. The capacitance of the quenching-circuit capacitor (C1) is 133 μF, and the inductance of the ring-around inductor (Dr) is 0.1 mH.

By comparison with a conventional common turn-off device, such as is disclosed in EP-B1-0,161,738, the common turn-off device (3) specified here has the advantage that the turn-off duration of the thyristors (Th1–Th6) can be variably set. The ring-around inductor (Dr) can be dimensioned comparatively small, so that the common quenching circuit requires little space.

Instead of connecting the thyristor (T3) in reverse-parallel with the thyristor (T1), it can also be connected to the thyristor (T1) in a parallel circuit together with the thyristor (T2), the cathode of the thyristor (T2) being connected to the anode of the thyristor (T3) (not represented).

The inverter (4) has 6 thyristors (Th1–Th6) which receive the turn-on pulses (S14) from an inverter turn-on pulse transformer (14), only one connection to the thyristor (Th1) being represented, in the interests of clarity.

A summer (13) sums a turn-on angle basic value signal ($\alpha_M$) arriving on the input side and a turn-on angle differential signal ($\Delta\alpha_M$) to give a turn-on angle signal ($\alpha_M^*$) on the output side which is fed to the inverter turn-on pulse transformer (14).

The inverter (4) delivers on the output side an inverter current ($i_{4R}$), which is subdivided with respect to the a.c. phase (R) into a capacitor current ($i_{CR}$) through the capacitor (CR) and a load current ($i_R$) through the load (7). The same holds for the two other phases (S, T). The inverter current ($i_{4R}$) is detected by means of a current transformer (9), and a load voltage ($U_R$) by means of a voltage transformer (11). A signal proportional to the load voltage ($U_R$) is fed via an integrator (15) to a feedback loop with phase interconnection or to a phase-locked loop (16) whose output signal (S16) is fed to the inverter turn-on pulse transformer (14). The output signal of the integrator (15) corresponds to a stator flux linkage ($\psi_1$). A corresponding result holds for the a.c. phases (S, T).

(6) designates a tachometer generator, which is coupled to the a.c. machine (7) and delivers a speed signal (n) on the output side.

Figure 2:
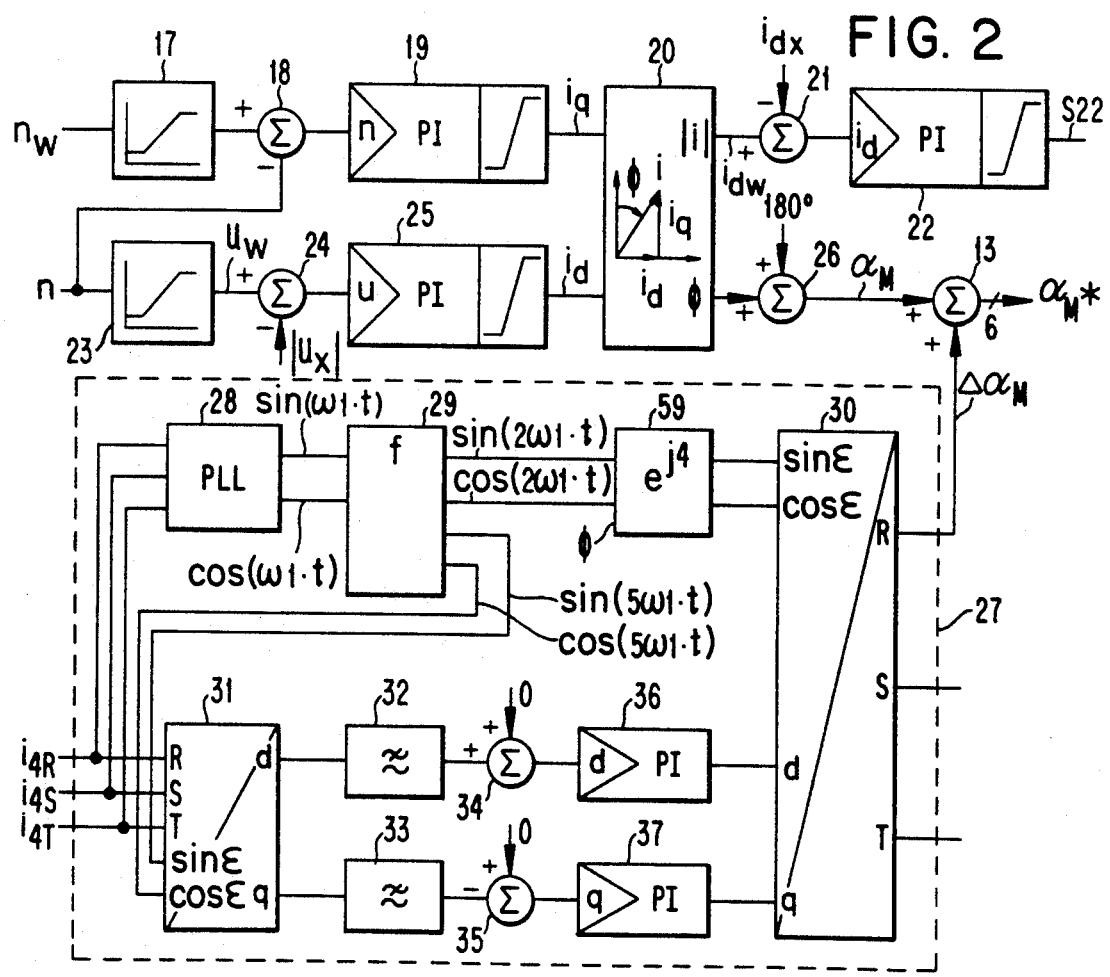
FIG. 2 shows a block diagram of a first control circuit for the converter according to FIG. 1.

FIG. 2 shows a circuit for a 1st turn-on angle control process. In this case, the speed signal (n) is fed to a ramp generator (23) and a negating input of a summer (18). On the output side, the ramp generator (23) delivers a desired value voltage signal ($U_w$) to a non-negating input of a summer (24) to whose negating input an absolute value signal ($|U_x|$) of the maximum value of the 3 load voltages ($U_R$, $U_S$, $U_T$), is conducted. The summer (24) is fed on the output side to a proportional-integral, or PI, controller with a bilateral limiter (25) which on the output side delivers a current component signal ($i_d$) to a coordinate converter (20). Fed to the coordinate converter (20) via a further ramp generator (17), to which a prescribable desired value speed signal ($n_w$) is fed on the input side, and further via the summer (18) and a PI controller, connected downstream thereof, with a bilateral limiter (19), is a further current component signal ($i_q$) which is interpreted in the coordinate converter (20) as a current component signal orthogonal to the current component signal ($i_d$). The ramp generator (17) is connected on the output side to a non-negating input of the summer (18).

An intermediate circuit desired value current signal ($i_{dw}$), which is fed to a non-negating input of a summer (21), can be tapped at an absolute value output ($|i|$) of the coordinate converter (20). A signal proportional to the intermediate circuit current ($i_{dx}$) is fed to a negating input of this summer (21). The summer (21) is connected on the output side to a PI controller with a bilateral limiter (22) whose output signal (S22) is fed to the rectifier turn-on pulse transformer (12).

An angular output ($\psi$) of the coordinate converter (20) is connected to a non-negating input of a summer (26) at which the turn-on angle basic value signal ($\alpha_M$) can be tapped on the output side. A 180° signal is fed to a further non-negating input of the summer (26).

The turn-on angle differential signal ($\Delta\alpha_M$) is generated in a resonance damping element (27) for the 5th harmonic. This resonance damping element (27) controls the 5th harmonic of the static converter current to 0. It has a 3-phase/2-phase coordinate converter (31) whose 3-phase inputs are fed current signals proportional to the inverter currents ($i_{4R}$, $i_{4S}$, $i_{4T}$). A two-phase output (d) of the 3-phase/2-phase coordinate converter (31) is connected via a low-pass filter (32) of 2nd order, a summer (34) and a PI controller (36) to a 2-phase input (d) of a 2-phase/3-phase coordinate converter (30). The low-pass filter (32) is connected on the output side to a non-negating input of the summer (34). A 0 signal is fed as desired value to a further non-negating input of the summer (34). The other 2-phase output of the 3-phase/2-phase coordinate converter (31) is likewise connected via a low-pass filter (33) of 2nd order, a summer (35) and a PI controller (37), connected downstream thereof, to the 2nd 2-phase input (9) of the 2-phase/3-phase coordinate converter (30). The low-pass filter (33) is connected on the output side to a negating input of the summer (35). A 0 signal is fed as desired value to a non-negating input of this summer (35).

A phase-locked loop (28), to which the inverter current signals ($i_{4R}$, $i_{4S}$, $i_{4T}$) are fed on the input side, delivers on output side a sine signal sin ($\omega 1 \cdot t$) and a cosine signal cos ($\omega 1 \cdot t$) to a function generator (29) for goniometric functions. On the output side, said generator delivers a sine signal sin ($2 \cdot \omega 1 \cdot t$) and a cosine signal cos ($2 \cdot \omega 1 \cdot t$) to a phase-shifting device or phase rotator (59), to which a phase signal corresponding to an angle of rotation ($\psi$) of preferably −90° is additionally fed. In this arrangement, ($\omega 1$) designates the angular frequency of the stator of the a.c. machine (7) and (t) the time. The phase rotator (59) is connected on the output side to inputs for sine $\epsilon$ and cos $\epsilon$ of the 2-phase/3-phase coordinate converter (30), ($\epsilon$) typifying the angle between the coordinate systems. At further outputs of the function generator (29), it is possible to tap signals for the functions $-\sin(5\cdot\omega 1\cdot t)$ and $\cos(5\cdot\omega 1\cdot t)$, which are fed to inputs for sin $\epsilon$ and cos $\epsilon$ of the 3-phase/2-phase coordinate converter (31).

It goes without saying that it is also possible by means of the function generator (29) to generate other goniometric functions than the ones specified. These are then used correspondingly to modify the turn-on angle basic value signal ($\alpha_M$).

The 3-phase/2-phase coordinate converter (31) transforms the R, S and T values into a rectangular $\alpha$, $\beta$ coordinate system, and the latter into a rectangular d, q coordinate system, rotated by the angle ($\epsilon$), in accordance with the transformation equations:

$$\alpha = 2 \cdot R/3 - S/3 - T/3$$

$$\beta = (1/\sqrt{3}) \cdot (S - T)$$

$$d = \alpha \cdot \cos \epsilon + \beta \cdot \sin \epsilon,$$

$$q = -\alpha \cdot \sin \epsilon + \beta \cdot \cos \epsilon.$$

The 2-phase/3-phase coordinate converter (30) transforms rectangular d, q coordinates through a rotation by the angle ($\epsilon$) into rectangular $\alpha$, $\beta$ coordinates, and the latter into 3-phase R, S, T coordinates in accordance with the transformation equations:

$$\alpha = d \cdot \cos \epsilon - q \cdot \sin \epsilon,$$

$$\beta = d \cdot \sin \epsilon + q \cdot \cos \epsilon,$$

$$R = \alpha,$$

$$S = -0.5 \cdot \alpha + 0.5 \cdot \sqrt{3} \cdot \beta,$$

$$T = -0.5 \cdot \alpha - 0.5 \cdot \sqrt{3} \cdot \beta.$$

This resonance damping process represented in FIG. 2 is also especially possible for other, more complicated drive controls, for example vector control, which act on the inverter (4) via a turn-on angle ($\alpha_M$). As represented in FIG. 1, the reference for this turn-on angle ($\alpha_M$) can be the machine voltage ($U_{R,S,T}$). It is also conceivable in principle, however, for other references such as, for example, the rotor flux linkage or the corresponding e.m.f to be used as reference for the turn-on angle ($\alpha_M$).

Figure 4:
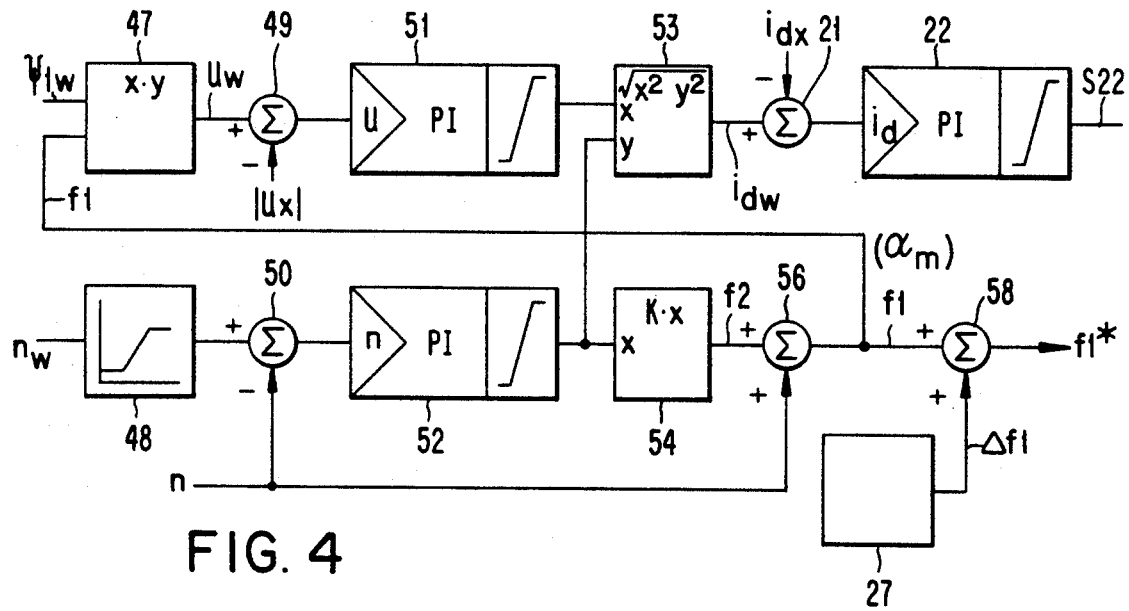
FIG. 4 shows a block diagram of a second control circuit for the converter according to FIG. 1.

FIG. 4 shows a circuit for a 2nd turn-on angle control process. In this case, a prescribable desired value speed signal ($n_w$) is fed via a ramp generator (48) to a non-negating input of a summer (50). A negating input of this summer (SO) is fed with the speed signal (n). On the output side, this summer (50) is connected via a PI controller with a bilateral limiter (52) and a multiplier (54) to a non-negating input of the summer (56). The speed signal (n) is fed to a further non-negating input of the summer (56). The multiplier (54) multiplies the value of the output signal of the PI controller with a bilateral limiter (52) by a prescribable factor (K) which represents an instrument parameter for the relationship: torque-slip frequency. The output signal of the multiplier (54) corresponds to the rotor frequency (f2) of the a.c. machine (7), and the output signal of the summer (56) to the stator frequency (f1). This output signal is fed to a non-negating input of a summer (58) and to a multiplier (47). The output signal of the resonance damping element (27) according to FIG. 2 is fed to a further non-negating input of the summer (58), which corresponds to the summer (13) according to FIG. 2, this output signal now corresponding to a differential frequency signal ($\Delta f1$) and no longer to a turn-on angle differential signal ($\Delta \alpha_M$).

A desired stator flux linkage value signal ($\psi_{1w}$) is fed as a further factor signal to the multiplier (47). A desired voltage value signal ($U_w$) present at the multiplier (47) on the output side is fed to a non-negating input of a summer (49). The absolute value signal of the load voltage ($U_x$) is fed to a negating input of the summer (49). On the output side, the summer (49) is connected via a PI controller with a bilateral limiter (51) and an absolute value computer (53) to a non-negating input of the summer (21) according to FIG. 2. The intermediate circuit current signal ($i_{dx}$) is fed to a negating input of this summer (21). On the output side, the summer (21) is connected via the PI controller with a bilateral limiter (22) to the rectifier turn-on pulse transformer (12). The absolute value computer (53), which is furthermore connected on the input side to the output of the PI controller (52), computes the absolute value of the vector, which is formed from the orthogonal components of its input signals (x) and (y), in accordance with $\sqrt{x^2 + y^2}$.

This resonance damping process via ($\Delta f1$), which is represented in FIG. 4, can also be used for all other control processes, for example vector control, which act on the inverter (4) via a frequency signal (f1).

Figure 3:
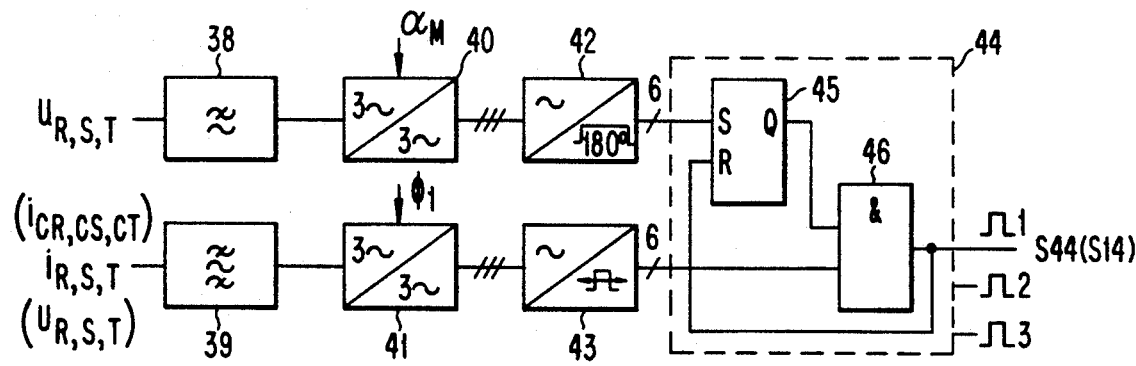
FIG. 3 shows a block diagram of a third control circuit for the inverter of the converter.

A 3rd turn-on pulse control process is explained in conjunction with FIG. 3. Load voltage signals ($U_R$, $U_S$, $U_T$) with respect to the a.c. phases (R, S, T), designated ($U_{R,S,T}$) for short, are fed for a conducting duration of 180° via a low-pass filter (38) and a phase rotator (40), which rotates the input signal by the turn-on angle basic value signal ($\alpha_M$), to a digitizer element (42) which is connected on the output side to the set input of an SR trigger element (45). This digitizer element (42) opens a turn-on window. The turn-on angle basic value signal ($\alpha_M$) can be obtained using one of the control processes given above, cf. FIGS. 2 and 4.

Load current signals ($i_R$, $i_S$, $i_T$), designated ($i_{R,S,T}$) for short, are fed via a bandpass filter (39) and a phase rotator (41) to a turn-on pulse generator (43) which is connected on the output side to an input of a AND element (46). The phase rotator (41) is fed with an angle of rotation ($\omega 1$) of preferably 90°. Inside the turn-on window generated by the conducting duration generator (42), the turn-on pulse generator (42) generates a transient turn-on pulse in the event of a positive-going zero crossing of a resonance oscillation. As a result, the turn-on pulse, which controls the thyristors (Th1-Th6), is temporally displaced with respect to the turn-on angle basic value signal ($\alpha_M$), corresponding to a turn-on angle modulation.

A 2nd input of the AND element (46) is connected to the Q output of the SR trigger element (45). On the output side, the AND element (46) is connected to the reset input of the SR trigger element (45) and to the control input of the thyristor (Th1). The SR trigger element (45) and the AND element (46) are parts, assigned to the thyristor (Th1), of a turn-on pulse logic circuit (44) whose output signal is designated by (S44) and corresponds to the turn-on pulse signal (S14) according to FIG. 1. For the purpose of turning on thyristors (Th2-Th6), the turn-on pulse logic circuit (44) contains corresponding circuits as for the thyristor (Th1).

Instead of the load current signals ($i_R$, $i_S$, $i_T$), the bandpass filter (39) can be fed on the input side with capacitor current signals ($i_{CR}$, $_{CS}$, $_{CT}$), corresponding to ($i_{CR}$, $i_{CS}$, $i_{CT}$), or load voltage signals ($U_{R,S,T}$), corresponding to ($U_R$, $U_S$, $U_T$).

Common to these three control processes is damping of harmonics, preferably the 5th harmonic, by turn-on angle modulation of the turn-on angle basic value signal ($\alpha_M$) for the inverter (4). In the first two control processes, there is added to the turn-on angle basic value signal ($\alpha_M$) or to the frequency signal (f1) a differential signal ($\Delta\alpha_M$) or ($\Delta$f1), cf. FIGS. 1 and 4, which is defined in general as follows:

$$\Delta\alpha_M = \sum_{k=1}^{k1} a_k \cdot \sin(k \cdot \omega 1 \cdot t + \gamma_k)$$

$$\Delta f1 = \sum_{k=1}^{k1} f_k \cdot \sin(k \cdot \omega 1 \cdot t + \gamma_k),$$

Figure 18:
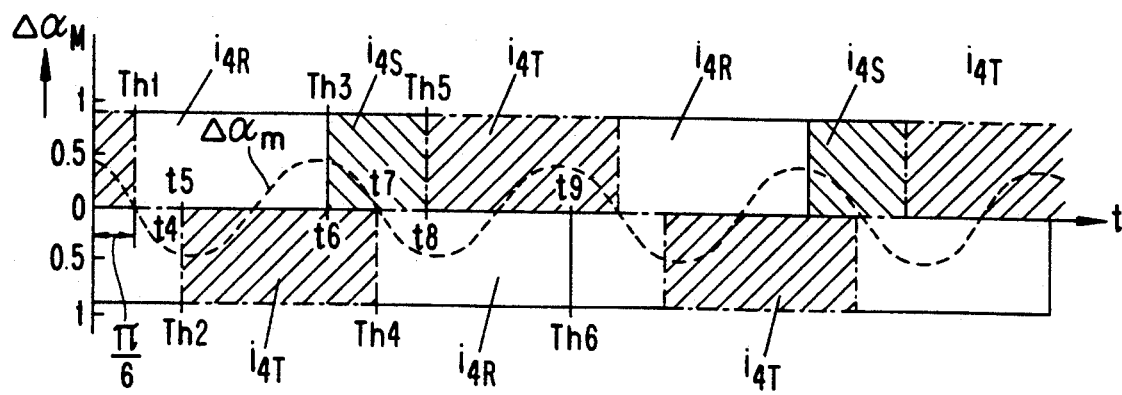
FIG. 18 shows a signal representation of the time characteristic of the difference in turn-on angle in the case of a control circuit according to FIG. 2.

$a_k$ and $f_k$ signifying constants, k a variable, k1 a constant $\geq 1$, $\omega 1$ the angular frequency of the line-side and/or load-side resonant circuit, t the time and $\gamma_k$ a phase angle. Preferably, the modulation signal $\sin(k \cdot \omega 1 \cdot t)$ should be phase-synchronized with an inverter current ($i_{4R}$, $i_{4S}$, $i_{4T}$). By a suitable choice of $\gamma_k$, it is also possible for this modulation signal to be applied such that in each case two of the six turn-on instants of the inverter (4) are not influenced by the turn-on angle difference ($\Delta\alpha_M$). With this boundary condition, as well, it is possible, for example, for a 5th harmonic in the inverter output current ($i_{4R}$, ...) to be controlled to 0. In particular, with $$\Delta\alpha_M = a_2 \cdot \sin(2 \cdot \omega 1 \cdot t + \gamma_2) \text{ or}$$

$$\Delta f1 = f_2 \cdot \sin(2 \cdot \omega 1 \cdot t + \gamma_2)$$

it is possible for the 5th harmonic to be eliminated by displacing only 4 turn-on instants (t5, t6, t8, t9) instead of 6, without the production of even harmonics or a direct system in the static converter current, cf. FIG. 18. There is no displacement in the case of the turn-on instants (t4) and (t7).

Figure 5:
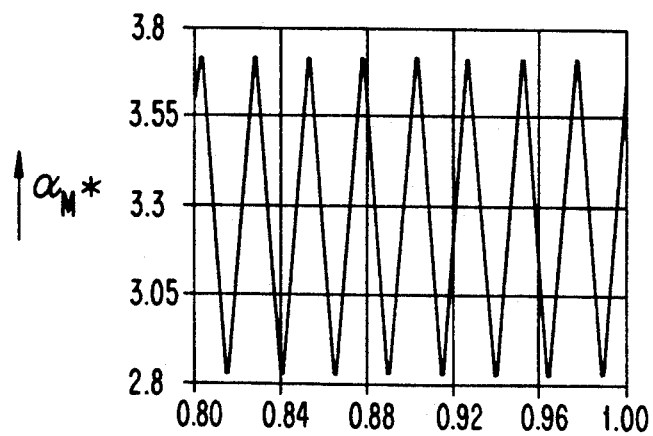
FIG. 5 shows a simulated signal diagram of the turn-on angle for the inverter of the converter according to FIG. 1 in the case of resonance damping.
Figure 6:
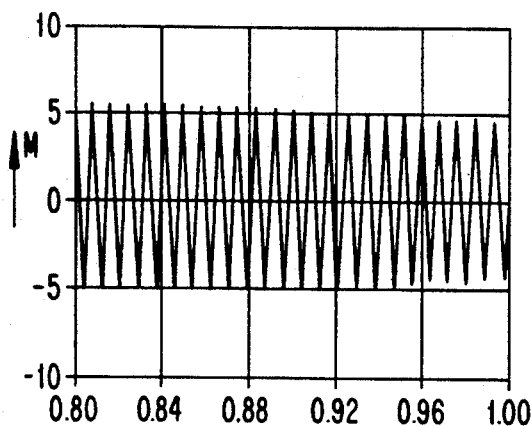
FIGS. 6, 8, 10 and 12 show simulated signal diagrams of the torque of the a.c. machine according to FIG. 1, the inverter current, the load current, and the load voltage, in each case for the phase R, without resonance damping.
Figure 7:
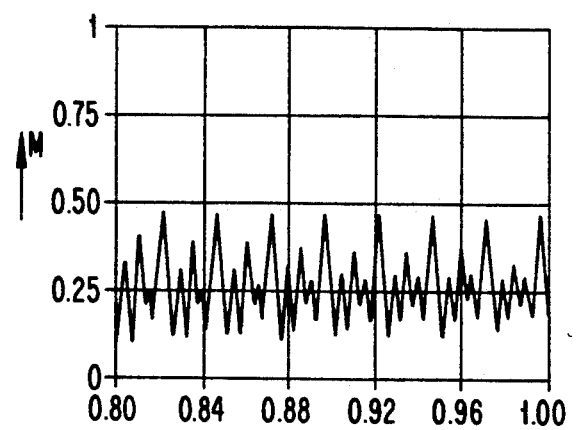
FIGS. 7, 9, 11 and 13 show simulated signal diagrams for the same variables as in the adjacent FIGS. 6, 8, 10 and 12, but with resonance damping of the 5th harmonic.
Figure 8:
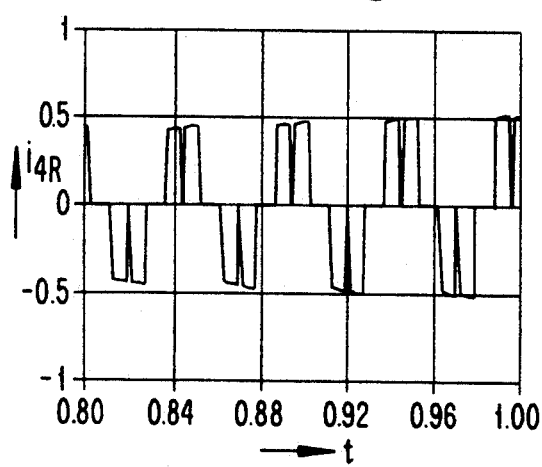
Figure 9:
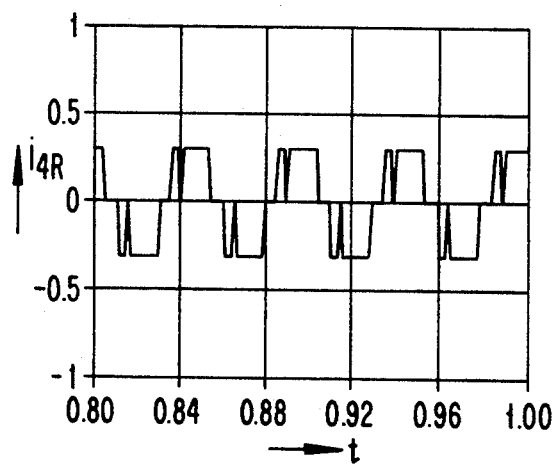
Figure 10:
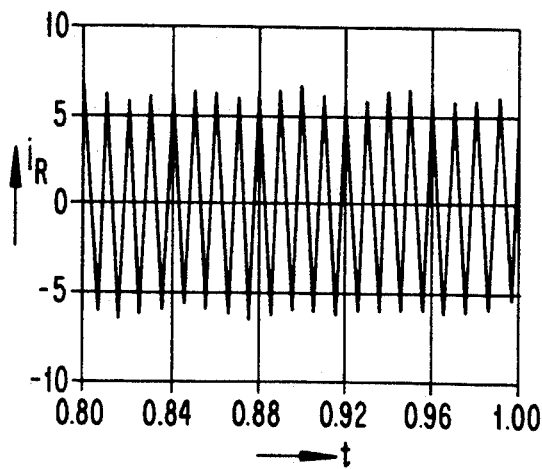
Figure 11:
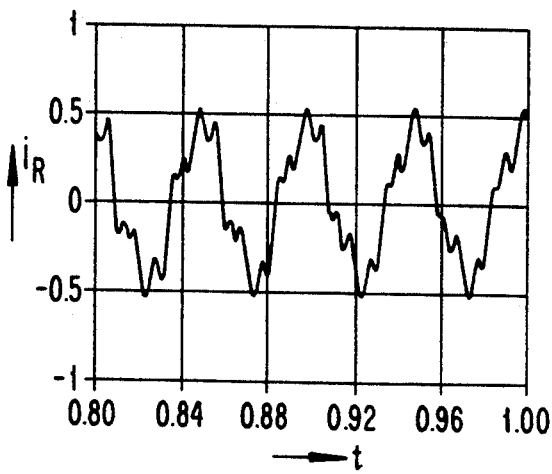
Figure 12:
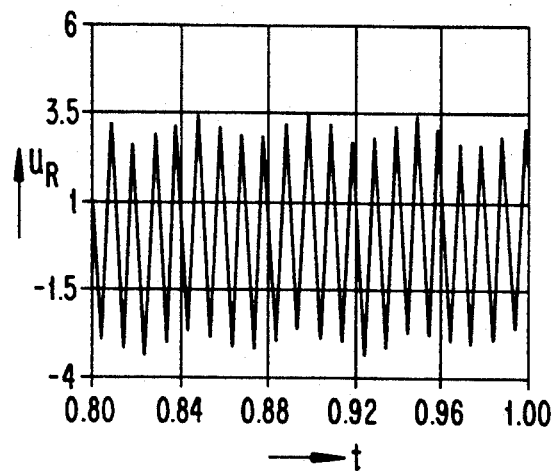
Figure 13:
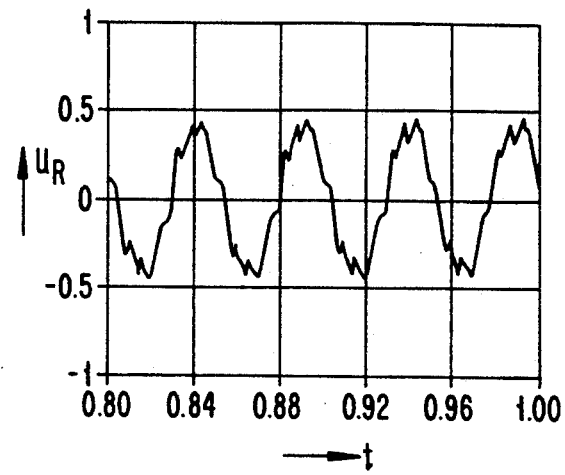

FIG. 5 shows the turn-on angle signal ($\alpha_M^*$) in radians as a function of time (t) at the resonance point for the 5th harmonic in the case of 40% of the rated speed, corresponding to approximately ¼ of the rated torque of the a.c. machine (7).

The following FIGS. 6, 8, 10 and 12 respectively show the electrical torque (M) of the A.c.. machine (7), the inverter current ($i_{4R}$), the load current ($i_R$) and the load voltage ($U_R$) without damping of the 5th harmonic, while the adjacent FIGS. 7, 9, 11 and 13 represent the same physical variables with damping of the 5th harmonic. The time-dependent curves represented were obtained by means of computer simulation; they show very clearly the damping effect through the example of the a.c. phase (R).

The converter (1–4) with its d.c. intermediate circuit (2, 3) feeds an impressed current into the system which is connected to its output terminals. This impressed, rectangular current can excite existing resonance points in the connected system on the line side, or else on the machine side. This excitation can also be produced particularly by the harmonics contained in the current, such a system being capable of amplifying the harmonics very strongly. Particularly in the case where the frequency of the corresponding harmonic corresponds precisely to the resonant frequency, a ringing oscillation whose amplitude is limited solely by the ohmic losses is produced in the case of a high-quality resonant circuit. In the case of the abovementioned so-called I converter, such a resonant system is formed by the capacitor bank with the load capacitors (CR, CS, CT) and the leakage inductances of the a.c. machine (7).

Designating the sum of the leakage inductances of the a.c. machine (7) by $L_7$ and the capacitance of the capacitor bank by C, the angular frequency of the resonance is yielded in accordance with:

$$\omega_{RES} = 1/\sqrt{L_7 \cdot C}$$

For example the resonant frequency is $f_{Res} \approx 100$ Hz in the case of a 50 Hz a.c. machine (7). At certain speeds, the harmonics of the alternating current of the inverter (4) precisely match this resonant frequency. This takes place at the output frequency $f1 = f_{Res}/m$ for the mth harmonic.

In the case of turn-on angle modulation where $$\Delta\alpha_M = a_2 \cdot \sin(2 \cdot \omega 1 \cdot t),$$

optimum $a_2$ values can be determined by Fourier analysis as follows ($n_{rated}$ = rated frequency):

5th harmonic $a_2 = 0.43$, $n = 0.4\, n_{rated}$,
7th harmonic $a_2 = 0.78$, $n = 0.286\, n_{rated}$,
11th harmonic $a_2 = 0.19$, $n = 0.19\, n_{rated}$,
13th harmonic $a_2 = 0.32$, $n = 0.154\, n_{rated}$.

The sum of the harmonics can be held somewhat lower still by using additional modulation signals of, for example, $a_4 \cdot \sin(4 \cdot \omega 1 \cdot t)$.

Figure 15:
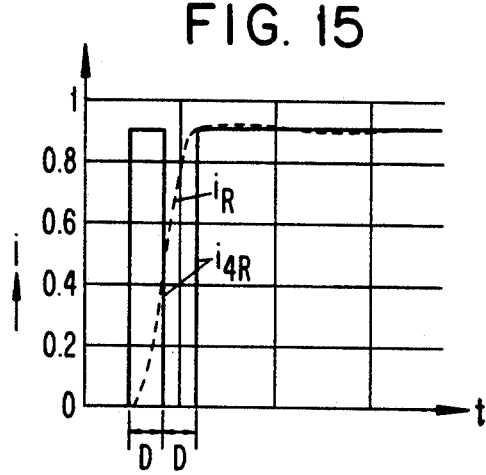
FIG. 15 shows a signal diagram of the excitation of the same resonant system as in FIG. 14, but with a current gap in the static converter current, FIGS. 16a)-c) show signal representations of the inverter currents for 3 a.c. phases with current gaps in the middle of the pulse block for damping the 7th harmonic, FIG. 17a) shows a temporal sequence of quenching pulses of the quenching circuit according to FIG. 1 for producing current gaps for damping the 11th and 13th harmonic, FIGS. 17b)-d) show signal representations of the alternating currents for 3 a.c. phases with current gaps at the ends of the pulse blocks for damping the 11th and 13th harmonic.

In the lower speed range of a drive, this resonance excitation can be most simply eliminated by an optimally selected operating sequence. In this case, a current gap duration (D) such as can be seen in FIG. 15 is defined by the resonant frequency ($f_{Res}$) itself in accordance with:

$$D = 1/(6 \cdot f_{Res}).$$

This current gap duration (D) is a constant independent of the instantaneous speed. The current gap can be generated either by a valve change in a GTO or self-commutating I converter or by a common quenching circuit (3) of the machine-side inverter (4). In the case of a common quenching circuit (3), this current gap is found simultaneously in all static converter currents.

Figure 14:
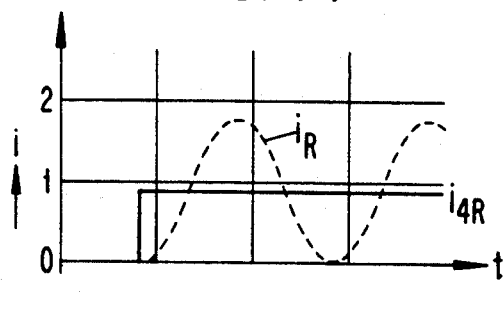
FIG. 14 shows a signal diagram of the excitation of a resonant system by a square-wave pulse.

FIG. 14 shows in dashes the excitation of a resonant system, for example the motor current ($i_R$), through a rectangular current pulse, for example the load current ($i_R$).

FIG. 15 shows an optimum current gap with a current gap duration (D) in the inverter current ($i_{4R}$) in the lower speed range, it being the case that, as in the FIG. 14, the current (i) is plotted on the ordinate and the time (t) on the abscissa. It is seen from the variation of the load current ($i_R$) that its oscillations are strongly damped. It is principally the 11th and 13th harmonic that can be effectively damped using such a gap at the distance of a current gap duration (D) from the start and end of a rectangular current pulse.

Figure 17A:
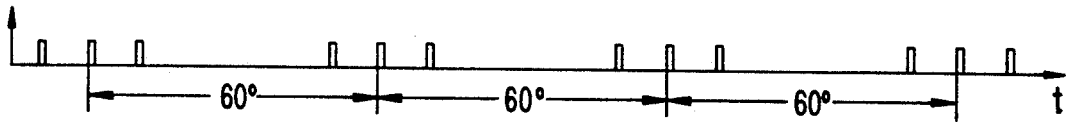
Figure 17B:
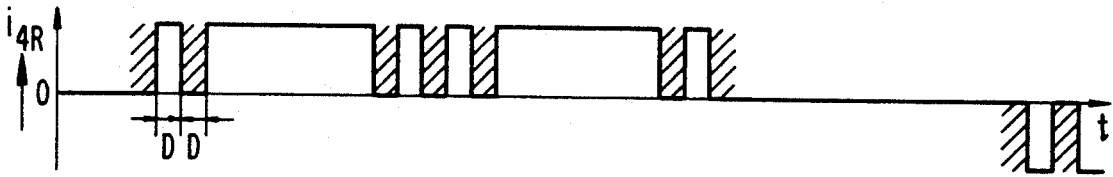
Figure 17C:
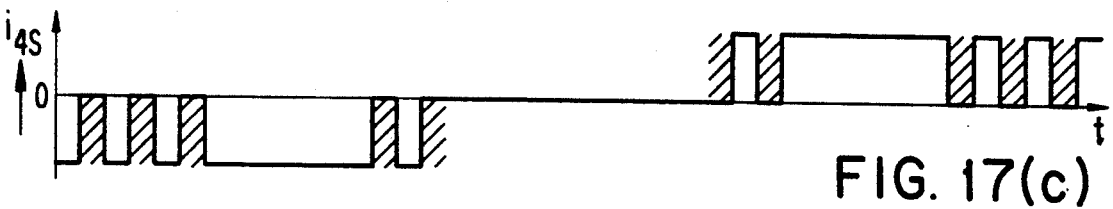
Figure 17D:
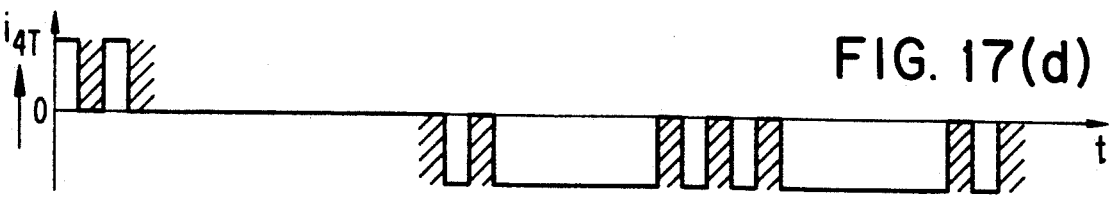

FIGS. 17b) to 17d) show inverter current signals ($i_{4R}$, $i_{4S}$, $i_{4T}$) as a function of time (t) with reference to the a.c. phases (R, S, T), in which current gaps with a current gap duration (D) are represented hatched inside the current blocks. The current gaps are generated by means of the common quenching circuit (3). The temporal sequence of the turn-on signals for turning on thyristors (T1) or (T3) of the common quenching circuit (3), that is to say for quenching the thyristors (Th1-Th6) of the inverter (4), is represented in FIG. 17a). The 11th and 13th harmonic in the lower speed range of the a.c. machine (7) are damped in each case by a current gap of current gap duration (D) at a distance of a current gap duration (D) from the start and end of each current block. The three current gaps in the middle of each current block, which are necessarily additionally produced, are undesired in this case, but not harmful.

Figure 16A:
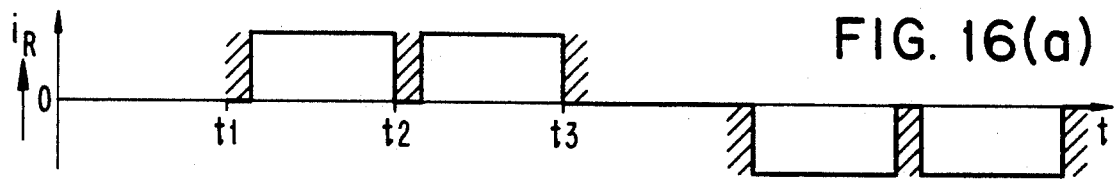
Figure 16B:
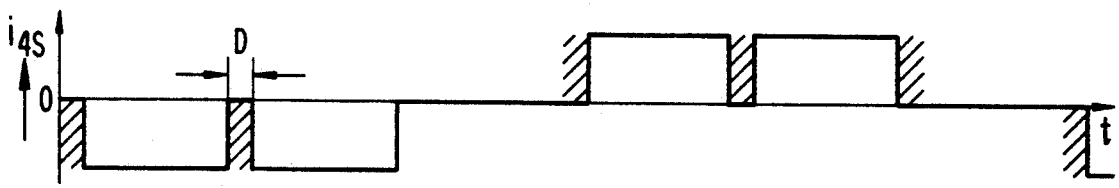
Figure 16C:
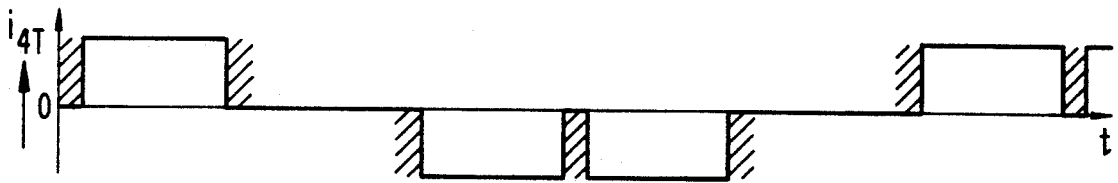

During further running up of the a.c. machine (7), the 7th harmonic causes interference at a static converter output frequency of $f1 = f_{Res}/7$ ($=0.286$). This 7th harmonic is damped by a current gap with a current gap duration (D) in the middle of each current block, cf. FIGS. 16a)-16d), in which the inverter current signals ($i_{4R}$, $i_{4S}$, $i_{4T}$) are represented as a function of time (t). These current gaps represented by hatching are likewise generated by means of the common quenching circuit (3). The inverter current ($i_{4T}$), cf. FIG. 16c), is turned off at an instant (t1), cf. FIG. 16a), by means of the common quenching circuit (3). As a result, a current gap is automatically produced in the middle of the current block in the case of the inverter current ($i_{4S}$), cf. FIG. 16b). The duration of the current gap is set equal to (D). The inverter current ($i_{4S}$) is turned off at a later instant (t2) by means of the common quenching circuit (3). As a result, a current gap is automatically produced in the middle of the current block of the inverter current ($i_{4R}$). When the inverter current ($i_{4R}$) is turned off at an instant (t3), a current gap is produced in the middle of the current block of the inverter current ($i_{4T}$), etc.

Particularly in the case of firmly prescribed components (C1) and (Dr), as well, the common quenching circuit (3) represented in FIG. 1 permits the duration of the current gap to be varied appropriately by the control of the thyristor (T2), and thus to be set optimally.

In the range where the 5th harmonic meets the resonance point ($f1 = f_{Res}/5 = 0.4$), the amplitude of the superimposed resonance oscillation is held low by the choice of optimum turn-on instants of the inverter (4). In this process, the 5th harmonic in the inverter current ($i_{4R}$, . . . ) must be controlled to 0, or the resonance oscillation must be detected in the voltage or in the machine current or in the capacitor current ($i_{CR}$) and evaluated. All these modulation processes are carried out in conjunction with fundamental frequency timing. This permits a high efficiency for powerful drives, particularly in conjunction with simple, slow and heavy-duty thyristors.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for eliminating or reducing at least one harmonic of a static converter, which is operationally connected to at least one line-side and/or load-side resonant circuit or to at least one reactive load, and/or for eliminating or reducing resonance oscillations of the line-side and/or load-side resonant circuit, comprising the steps of:
   a) varying at least one control instant or turn-on angle basic value signal of at least one controllable valve of the static converter by a temporal displacement of the turn-on instant as a function of passage of at least one resonant frequency range of an alternating current or load current; and/or
   b) generating at least one current gap in a respective current block of a static converter current, wherein for damping the 5th harmonic, the control instant or turn-on angle basic value signal or a frequency signal is varied by a turn-on angle differential signal or by a differential frequency signal, in accordance with a goniometric function of the type:

$$\Delta \alpha_M = \sum_{k=1}^{k1} a_k \cdot \sin(k \cdot \omega 1 \cdot t + \gamma_k)$$

$$\Delta f1 = \sum_{k=1}^{k1} f_k \cdot \sin(k \cdot \omega 1 \cdot t + \gamma_k)$$

where $a_k$ and $f_k$ signify constants, k a variable, k1 a constant $\geq 1$, $\omega 1$ the angular frequency of the line-side and/or load-side resonant circuit, the time and $\gamma_k$ a phase angle, and the signal sin is selected to be phase-synchronous with respect to a static converter current.

2. The process as claimed in claim 1, wherein the turn-on angle differential signal or the differential frequency signal is generated from current signals or static converter current signals, or load current signals or capacitor current signals or voltage signals or load voltage signals by a transformation into a rotating coordinate system whose rotational frequency corresponds at least approximately to the frequency of the harmonics to be eliminated or to be reduced, by subsequent low-pass filtering, subsequent proportional-integral control, in particular in mutually orthogonal coordinates, and subsequent transformation into a coordinate system rotating with a prescribable frequency.

3. A process for eliminating or reducing at least one harmonic of a static converter, which is operationally connected to at least one line-side and/or load-side resonant circuit or to at least one reactive load and/or for eliminating or reducing resonance oscillations of the line-side and/or load-side resonant circuit, comprising the steps of:
   a) varying at least one control instant or turn-on angle basic value signal of at least one controllable valve of the static converter by a temporal displacement of the turn-on instant as a function of passage of at least one resonant frequency range of an alternating current or load current; and/or
   b) generating at least one current gap in a respective current block of a static converter current, wherein, particularly for damping the 7th harmonic, a current gap with a prescribable current gap duration is generated in the middle of a current block of the static converter current.

4. A process for eliminating or reducing at least one harmonic of a static converter, which is operationally connected to at least one line-side and/or load-side resonant circuit or to at least one reactive load, and/or for eliminating or reducing resonance oscillations of the line-side and/or load-side resonant circuit, comprising the steps of:
   a) varying at least one control instant or turn-on angle basic value signal of at least one controllable value of the static converter by a temporal displacement of the turn-on instant as a function of passage of at least one resonant frequency range of an alternating current or load current; and/or
   b) generating at least one current gap in a respective current block of a static converter current, wherein for damping the 11th and 13th harmonics, a current gap with a prescribable current gap duration is generated at a prescribable distance after the start and before the end of a current block of the static converter current and the prescribable duration or current gap is equal to:

$$D = 1/(6 \cdot f_{Res}),$$

where $f_{Res}$=fundamental frequency of the resonant circuit, current gaps with the prescribable current gap duration being generated by a common quenching pulse common to all the controllable valves of the static converter or the quenching pulse of a common quenching circuit or quenching circuit or by a forced short circuit in the static converter.

5. A process for eliminating or reducing at least one harmonic of a static converter, which is operationally connected to at least one line-side and/or load-side resonant circuit or to at least one reactive load, and/or for eliminating or reducing resonance oscillations of the line-side and/or load-side resonant circuit, comprising the steps of:
   a) varying at least one control instant or turn-on angle basic value signal of at least one controllable valve of the static converter by a temporal displacement of the turn-on instant as a function of passage of at least one resonant frequency range of an alternating current or load current; and/or
   b) generating at least one current gap in a respective current block of a static converter current, wherein the displacement of the turn-on instant for the at least one controllable valve is generated as a function of current signals or load current signals or capacitor current signals or voltage signals or load voltage signals by bandpass filtering with subsequent detection of a rising zero crossing of the filtered signal.

6. A device for eliminating or reducing at least one harmonic of a static converter, which is operationally connected to at least one line-side and/or load-side resonant circuit or at least one reactive load, and/or for eliminating or reducing resonance oscillations of the line-side or load-side resonant circuit, comprising:
   a) a bridge-connected inverter with thyristors in its bridge arms, whose control inputs are operationally connected to an inverter turn-on pulse transformer, wherein
   b) a summer is provided which is fed on the input side with a turn-on angle basic value signal or a frequency signal and a turn-on angle differential signal or a differential frequency signal, and which on the outside side is connected for control purposes to the inverter turn-on pulse transformer,
   c) a resonance damping element for adjusting turn-on angle particularly for the 5th harmonic of the resonant circuit, which is fed on the input side with current signals or static converter current signals, or load current signals or capacitor current signals or voltage signals or load voltage signals, which contain the harmonic to be damped, and which on the output side is operationally connected to the summer, said resonance damping element further including:
   a 3-phase/2-phase coordinate converter on an input side of the resonance damping element whose 2-phase outputs, which contain as direct components 2 mutually orthogonal components of the harmonics to be eliminated or to be reduced, are each operationally connected via a low-pass filter, each with a downstream PI controller, to 2-phase inputs of a 2-phase/3-phase coordinate converter, at which the turn-on angle differential signal or the differential frequency signal can be tapped on the output side,
   coordinate angle inputs of the 3-phase/2-phase coordinate converter which are operationally connected via a function generator for goniometric functions to a phase-locked loop which, like the 3-phase/2-phase coordinate converter is fed on the input side with the input signals of the resonance damping element, and
   outputs of the function generator for goniometric functions which are operationally connected via a phase rotator with a prescribable angle of rotation to coordinate angle inputs of the 2-phase/3-phase coordinate converter.

7. A device for eliminating or reducing at least one harmonic of a static converter, which is operationally connected to at least one line-side and/or load-side resonant circuit or to at least one reactive load, and/or for eliminating or reducing resonance oscillations of the line-side or load-side resonant circuit, comprising:
   a bridge-connected inverter with thyristors in its bridge arms, whose control inputs are operationally connected to an inverter turn-on pulse generator
   a turn-on angle adjuster having a phase rotator which on the input side is operationally connected to a bandpass filter and on the output side to the turn-on pulse generator, the bandpass filter being fed on the input side with current signals or static converter current signals or load current signals or capacitor current signals or voltage signals or load voltage signals, which contain the harmonic to be damped.

8. The device as claimed in claim 6, wherein
   a) connected in parallel with the inverter is a common quenching circuit,
   b) which has a 1st series circuit of at least one quenching capacitor and at least a 1st electrical valve, which 1st series circuit is operationally connected to a positive supply terminal and a negative supply terminal,
   c) in a parallel circuit to the at least one quenching capacitor there is provided a 2nd series circuit of at least one inductive reactance with a controllable 2nd electrical valve whose negative potential side is operationally connected to the quenching capacitor, and
   d) a controllable 3rd electrical valve is provided in a parallel circuit to the 2nd electrical valve, the direction of current flow of the 3rd electrical valve being opposite to that of the 2nd electrical valve.

* * * * *